(12) United States Patent
Ko et al.

(10) Patent No.: US 6,882,396 B2
(45) Date of Patent: Apr. 19, 2005

(54) LIQUID CRYSTAL DISPLAY HAVING NO GATE PCB AND FPC

(75) Inventors: Young Yik Ko, Kyoungki-do (KR); Dong Hwan Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 100 days.

(21) Appl. No.: 10/618,356

(22) Filed: Jul. 11, 2003

(65) Prior Publication Data

US 2004/0017535 A1 Jan. 29, 2004

(30) Foreign Application Priority Data

Jul. 29, 2002 (KR) .................................. 10-2002-44722

(51) Int. Cl.[7] .......................................... G02F 1/1345
(52) U.S. Cl. ..................................................... 349/149
(58) Field of Search .............................. 349/149, 150, 349/151, 152; 345/87, 88, 89, 90, 96

(56) References Cited

U.S. PATENT DOCUMENTS

| | | | |
|---|---|---|---|
| 6,731,369 B1 * | 5/2004 | Choo .......................... | 349/190 |
| 6,774,973 B1 * | 8/2004 | Ko ............................. | 349/153 |
| 6,829,029 B1 * | 12/2004 | Park et al. ................. | 349/149 |
| 2002/0122149 A1 * | 9/2002 | Choo et al. ................ | 349/149 |
| 2003/0038913 A1 * | 2/2003 | Choo .......................... | 349/149 |
| 2003/0117564 A1 * | 6/2003 | Park et al ................... | 349/149 |
| 2003/0117567 A1 * | 6/2003 | Jung et al. ................. | 349/149 |

* cited by examiner

*Primary Examiner*—Tarifur R. Chowdhury
*Assistant Examiner*—David Chung
(74) *Attorney, Agent, or Firm*—Ladas & Parry LLP

(57) ABSTRACT

The present invention relates to a liquid crystal display having no gate PCB and FPC. This comprises: a liquid crystal panel formed by an assemble an array substrate and a color filter substrate with a liquid crystal layer interposed therebetween; a plurality of source TCPs and gate TCPs, which are attached to a source and a gate of the liquid panel, respectively, and mounted with a gate driver IC and a source driver IC, respectively; a source PCB connected to the source TCPs and serving to apply a given driving signal to the source driver IC; a LOG formed on the liquid crystal panel such that a signal from the source PCB is applied to the gate driver IC via the gate TCPs; and transfers formed between the substrates at edges of the liquid crystal panel such that common voltage is applied to the color filter substrate. In this liquid crystal display, the LOG consists of gate driver IC-driving signal lines without having a common line for connecting the transfers with each other. According to the present invention, the common line is eliminated from the LOC so that a margin in a LOC layout can be ensured. This can reduce the resistance of the LOC to a suitable level and thus improve the screen quality of the liquid crystal display.

2 Claims, 4 Drawing Sheets

LIQUID CRYSTAL DISPLAY HAVING NO GATE PCB AND FPC

BACKGROUND OF THE INVENTION

1. Field of the Invention

The present invention relates to a liquid crystal display, and more particularly, to a Vcom line layout in a liquid crystal display having no gate PCB (printed circuit board) and FPC (flexible printed circuit).

2. Description of the Prior Art

A liquid crystal display, which has been developed as a substitute for CRT (cathode ray tube), can realize lightweight, thin thickness and low power consumption, so that it is in the spotlight as the next-generation image display device. Currently, various studies to improve the display performance of the liquid crystal display are conducted.

Generally, this liquid crystal display comprises: a liquid crystal panel as a substantial display element; gate and source PCBs (printed circuit boards) as driving circuits serving to apply a given signal to the liquid crystal panel; a FPC (flexible printed circuit) connecting the PCBs with each other; a TCP (top carrier package) or COF (chip on film) connecting the liquid crystal panel to PCBs and mounted with a driver IC; a backlight unit disposed below the liquid crystal panel and serving as a light source; and means for assembling the above elements.

Meanwhile, to reduce the cost and weight of the liquid crystal display, there was recently proposed a liquid crystal display structure in which a LOG (line-on-glass) is formed on the liquid crystal panel, particularly an array substrate of the liquid crystal panel, with omission of the gate PCB and the FPC, and this LOC is connected to the source PCB such that a given signal for driving the gate driver IC are supplied.

FIGS. 1 to 4 are top views showing liquid crystal displays according to the prior art. Specifically, FIG. 1 shows a structure having the gate PCB and the FPC, FIG. 2 shows a structure having no FPC, and FIG. 3 shows a structure having no the gate PCB and the FPC.

In FIGS. 1 to 3, the reference numeral 1 designates a source PCB, the reference numeral 2 designates a gate PCB, the reference numeral 3 designates a FPC, the reference numeral 4 designates source TCPs, the reference numeral 5 designates gate TCPs, the reference numeral 6 designates an array substrate, the reference numeral 7 designates a color filter substrate, the reference numeral 8 designates a display region, the reference numeral 9 designates a LOC, the reference numeral 10 designates a common line, and the reference numeral 11 designates transfers.

Referring to FIG. 2, in the case of the liquid crystal display having no FPC 3, the LOG is additionally formed on the array substrate 6 of the liquid crystal panel in order to transmit a driving signal to the gate driver IC. Examples of such a driving signal include gate low voltage, gate high voltage, STV, CPV, OE, CND, Vdd, common voltage signals and the like, in which the common voltage signal is a signal for transmitting common voltage to the color filter substrate.

Referring to FIG. 3, in the case of the liquid crystal display having no PCB 2 and FPC 3, the LOG 9 is additionally formed on the array substrate of the liquid crystal panel as in the liquid crystal display having no FPC. In this case, the LOG 9 is also formed between the gate TCPs 5. Moreover, in order to transmit a common signal to the transfers 11 formed at the upper and lower portions of the lift side of the liquid crystal panel, the common line 10 is formed.

However, in the prior liquid crystal display having no gate PCB and FPC, since the LOG that is additionally formed on the array substrate must be formed to have low resistance, but this requirement is restricted by a spatial problem so that the problem of screen quality is caused.

Namely, although the adjustment of resistance of the LOG is very critical to avoid the problem of screen quality of the liquid crystal display having no FPC, it is difficult to adjust the resistance of the LOG to a suitable level, due to the spatial restriction. For this reason, the problem of output of the gate driver IC can be caused, and thus, the problem of screen quality of the liquid crystal display can occur.

Particularly, in the case of the common line in the LOG line, if the transfers are formed on a gate pad region, there will be defined a region in which the common line will be formed. For this reason, other lines need to be formed on the remaining regions other than this common line region, and thus, the spatial restriction will be serious. In this case, the transfers are usually formed to have a size of 0.5–1.5 mm. In addition, since specifications of pin arrangements in the driver IC are limited, this problem will be more serious.

SUMMARY OF THE INVENTION

Accordingly, the present invention has been made to solve the above-mentioned problems occurring in the prior art, and an object of the present invention is to provide a liquid crystal display having no gate PCB and FPC, which can prevent the deterioration of screen quality caused by LOG line resistance.

To achieve the above object, the present invention provides a liquid crystal display having no gate PCB and FPC, which comprises: a liquid crystal panel formed by an assemble an array substrate and a color filter substrate with a liquid crystal layer interposed therebetween; a plurality of source TCPs and gate TCPs, which are attached to a source and a gate of the liquid panel, respectively, and mounted with a gate driver IC and a source driver IC, respectively; a source PCB connected to the source TCPs and serving to apply a given driving signal to the source driver IC; a LOG formed on the liquid crystal panel such that a signal from the source PCB is applied to the gate driver IC via the gate TCPs; and transfers formed between the substrates at edges of the liquid crystal panel such that common voltage is applied to the color filter substrate; in which the LOG consists of gate driver IC-driving signal lines without having a common line for connecting the transfers with each other.

According to the present invention, there is no common line in the LOC so that a margin in a LOG layout can be ensured. This can reduce the resistance of the LOG to a suitable level and thus improve the screen quality of the liquid crystal display.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will now be described in detail with reference to the accompanying drawings.

Figure 1:
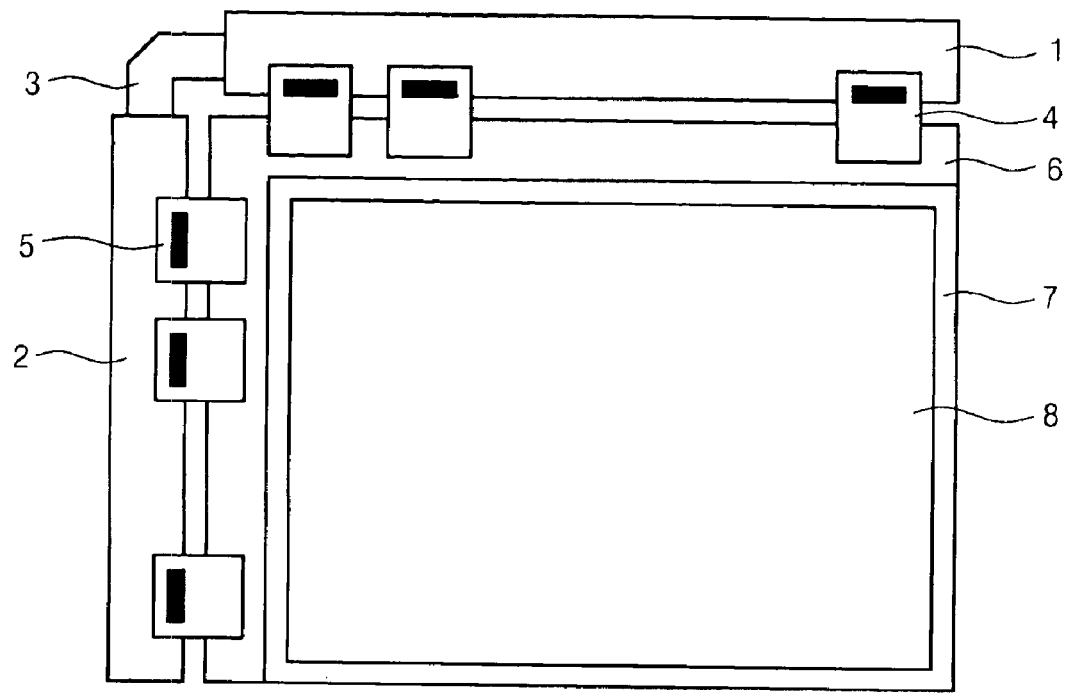
FIG. 1 is a top view showing a prior liquid crystal display.
Figure 2:
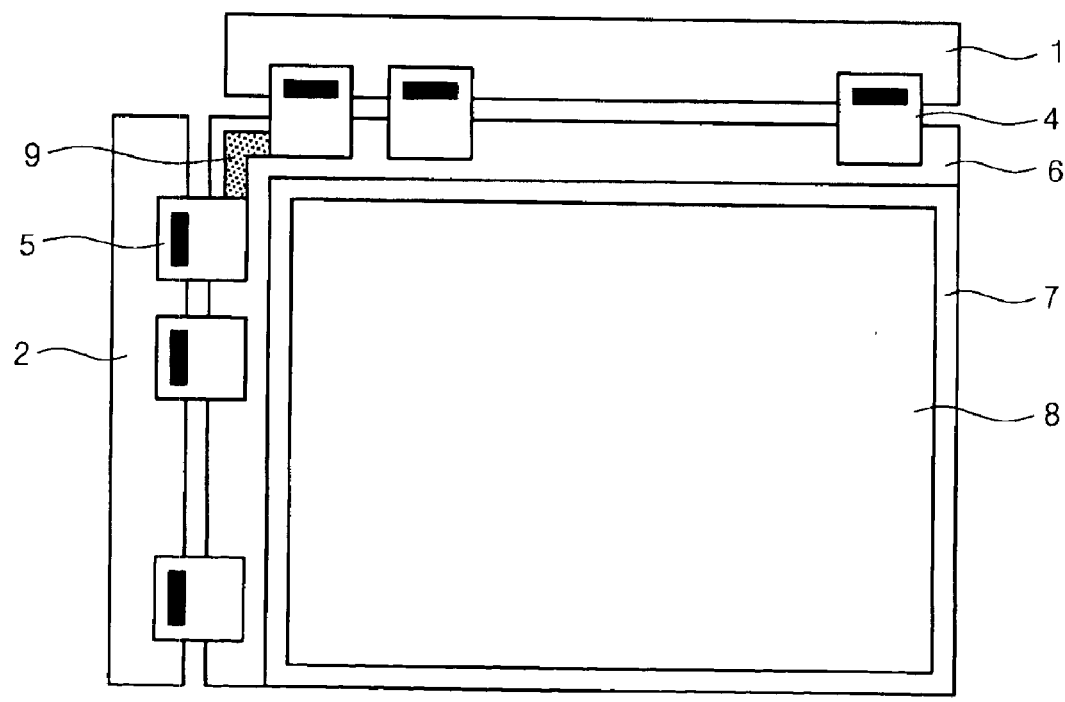
FIG. 2 is a top view showing a prior liquid crystal display having no FPC.
Figure 3:
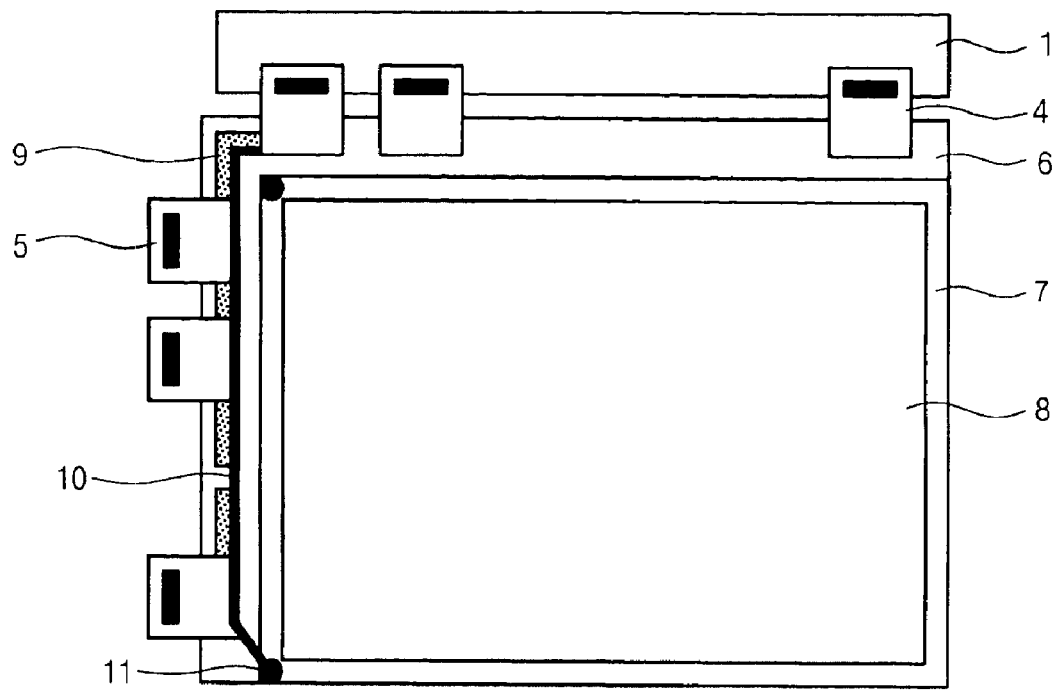
FIG. 3 is a top view showing a prior liquid crystal display having no gate PCB and FPC.
Figure 4:
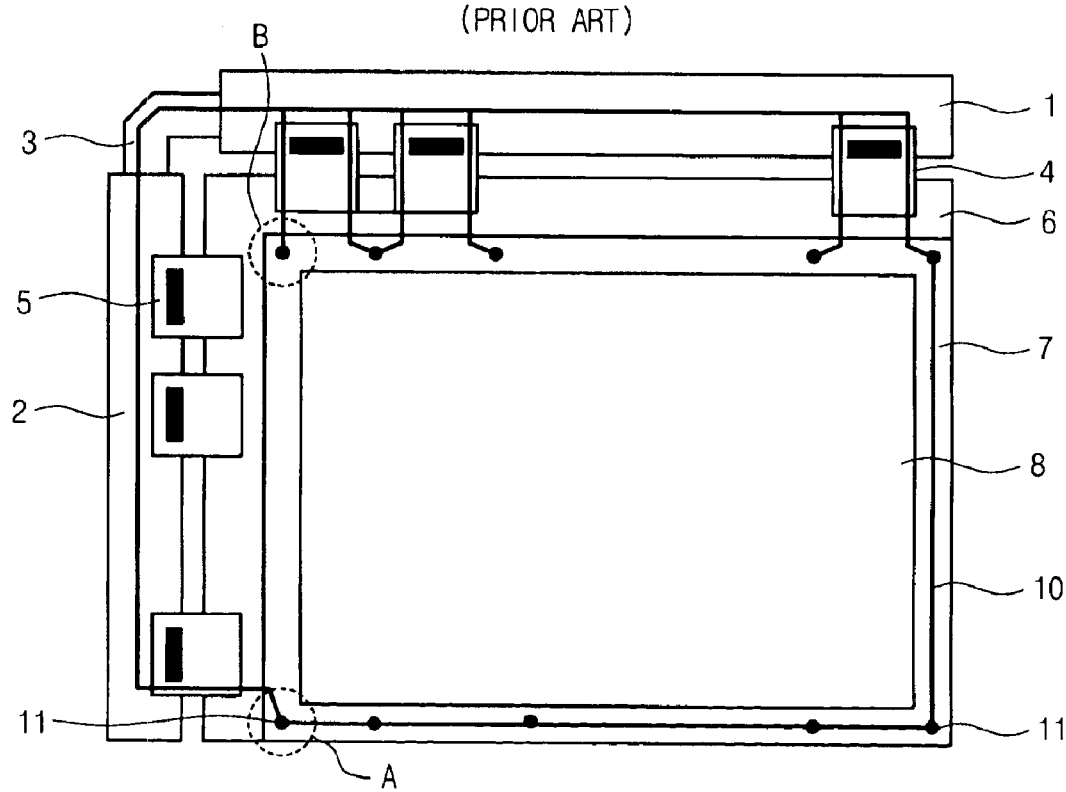
FIG. 4 is a top view illustrating a common line in a prior liquid crystal display.

FIG. 4 is a top view showing a common line of a liquid crystal display according to the prior art. As shown in FIG. 4, in the prior liquid crystal display, a gate PCB 2 and a common line 10 within a liquid crystal panel are used to transmit a common signal (Vcom) to a first transfer A formed at the lower portion of the left side of the liquid crystal panel. In this case, the common signal (Vcom) is transmitted to the first transfer A in order to apply common voltage to a color filter substrate 8.

In a structure having no gate PCB, the common signal can be applied to the first transfer only when a common line is additionally formed in the panel. However, since a second transfer B formed at the upper portion of the left side of the panel takes a large area of the LOG, the resistance of the rest of the LOG is increased as compared to a case where the common line is not present without the second transfer. Particularly, if the transfer is formed between gate pads, the LOC will have more increased resistance.

Figure 5:
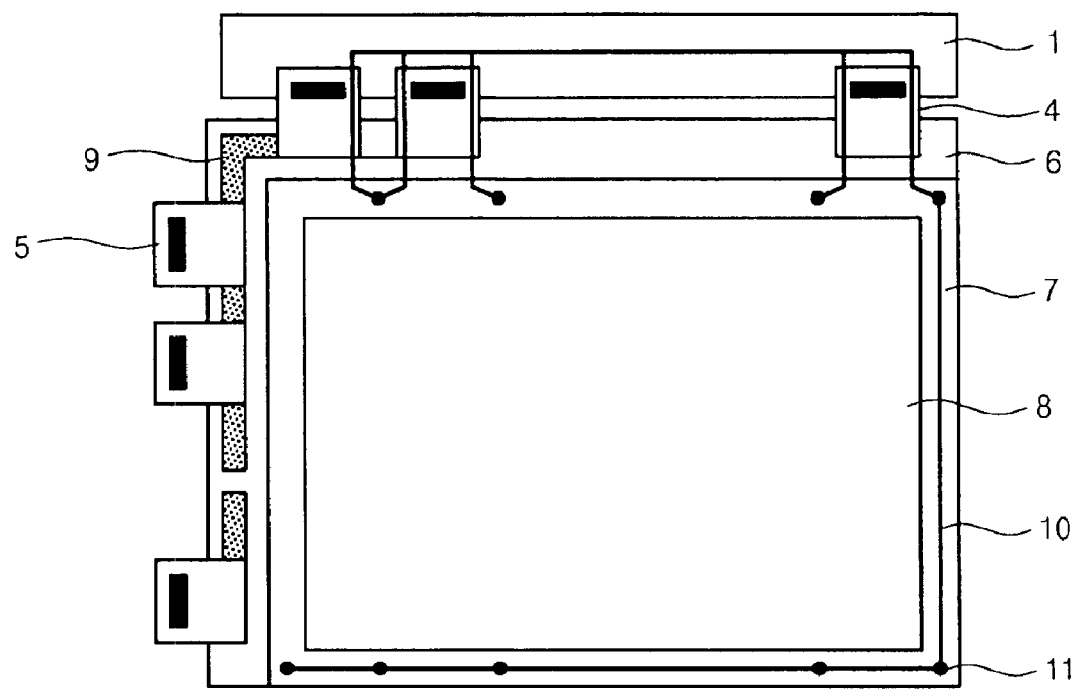
FIG. 5 is a top view showing an inventive liquid crystal display having no gate PCB and FPC.

According to the present invention, in order to prevent the resistance of the LOC from being increased, the transfer at the upper portion of the left side of the panel is not formed, as shown in FIG. 5. In addition, the common line 10 for connecting the transfers at the upper and lower portions of the panel with each other is not formed in the LOG 9.

Namely, the liquid crystal display according to the present invention comprises: a liquid crystal panel formed by an assemble of an array substrate 6 and a color filter substrate 7 with a liquid crystal layer interposed therebetween; a plurality of source TCPs 4 and gate TCPs 5, which are attached to a source and a gate of the liquid crystal panel, respectively, and mounted with a gate driver IC and a source driver IC, respectively a source PCB 1 connected to the source TCPs 4 and serving to apply a given driving signal to the source driver IC; and a LOG 9 formed on the liquid crystal panel such that a signal from the source PCB 1 is applied to the gate driver IC via driving signal lines of the gate TCPs 5. In this liquid crystal display, transfers 11 are formed between the substrates at edges of the liquid crystal panel such that common voltage is applied to the color filter substrate. Particularly, the LOG 9 consists of the gate driver IC-driving signal lines without having a common line for connecting the transfers with each other. In addition, the gate TCPs 4 comprise the driving signal lines without having the common line.

According to this liquid crystal display of the present invention, the area of the common line taking the transfers and the LOG 9 can be provided for forming other signal lines, so that the resistance of the gate driver IC-driving signal lines is reduced. This shortens the delay of the respective signal lines and thus allows excellent screen quality to be achieved.

In addition, in the gate TCPs, the common line does not need to be formed, so that the formation of lines can be simplified.

Figure 6:
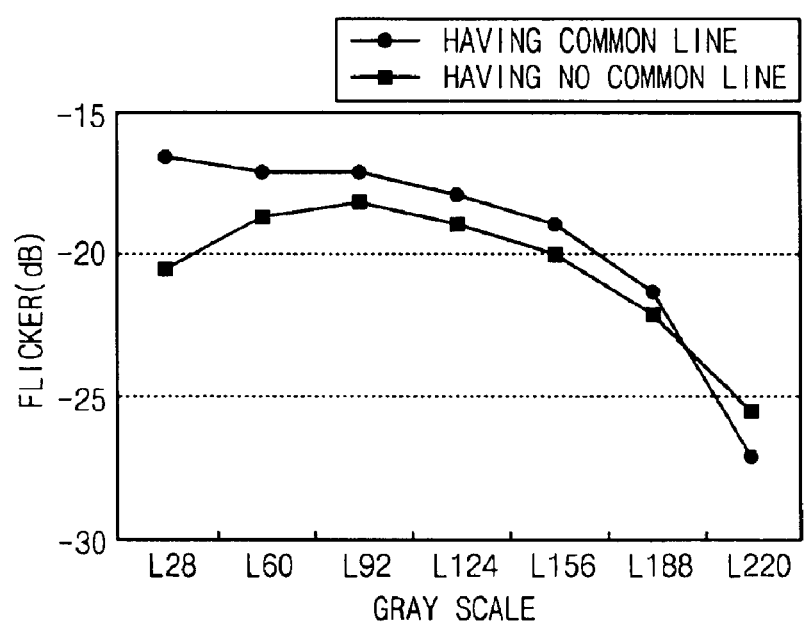
FIGS. 6 and 7 are top views flicker and crosstalk properties of a liquid crystal display according to the present invention.
Figure 7:
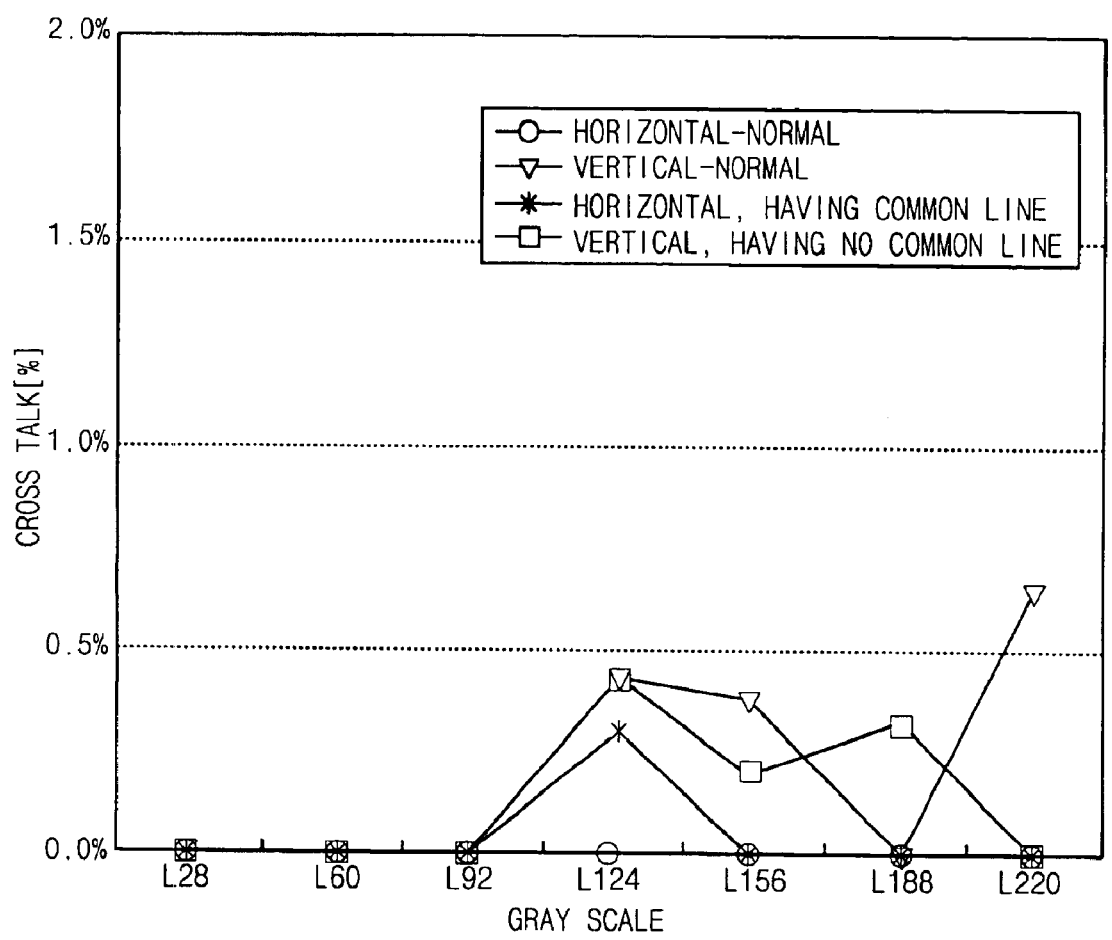

FIGS. 6 and 7 are drawings showing flicker and crosstalk properties of the liquid crystal display according to the present invention.

From FIG. 6, it can be found that the inventive liquid crystal display where the LOG has no common line and thus a common signal is not inputted shows better flickers at each gray scale, as compared to the prior liquid crystal display where a common signal is normally inputted through the common line of the LOG.

From FIG. 7, it can be found that the inventive liquid crystal display and the prior liquid crystal display show substantially similar results on all horizontal and vertical crosstalk properties. This indicates that the elimination of the common line has no effect on the crosstalk properties.

As described above, according to the present invention, the common line is eliminated from the LOC of the liquid crystal display having no gate PCB and FPC, so that the resistance of the LOC can become the desired level. Thus, the output of the gate driver IC can be stabilized, and particularly, the delay of the respective signal lines can be reduced, thereby improving the screen quality of the liquid crystal display.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display having no gate PCB and FPC, which comprises: a liquid crystal panel formed by an assemble an array substrate and a color filter substrate with a liquid crystal layer interposed therebetween; a plurality of source TCPs and gate TCPs, which are attached to a source and a gate of the liquid panel, respectively, and mounted with a gate driver IC and a source driver IC, respectively; a source PCB connected to the source TCPs and serving to apply a given driving signal to the source driver IC; a LOG formed on the liquid crystal panel such that a signal from the source PCB is applied to the gate driver IC via the gate TCPs; and transfers formed between the substrates at edges of the liquid crystal panel such that common voltage is applied to the color filter substrate; in which the LOG consists of gate driver IC-driving signal lines without having a common line for connecting the transfers with each other.

2. The liquid crystal display of claim 1, wherein the gate TCPs comprise the driving signal lines without having the common line.

* * * * *